Figure 12:
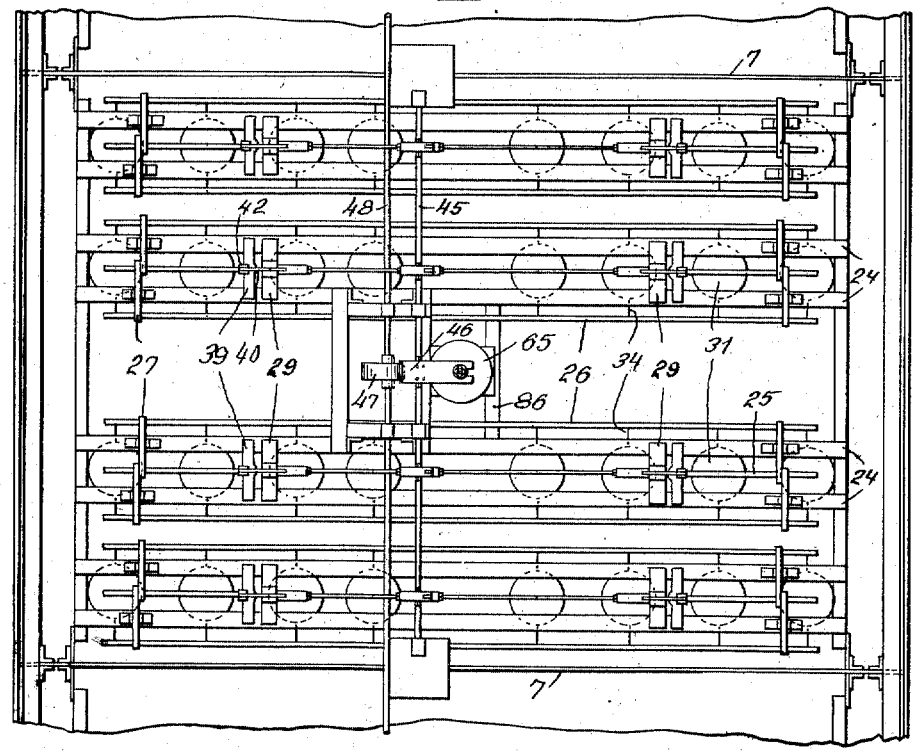

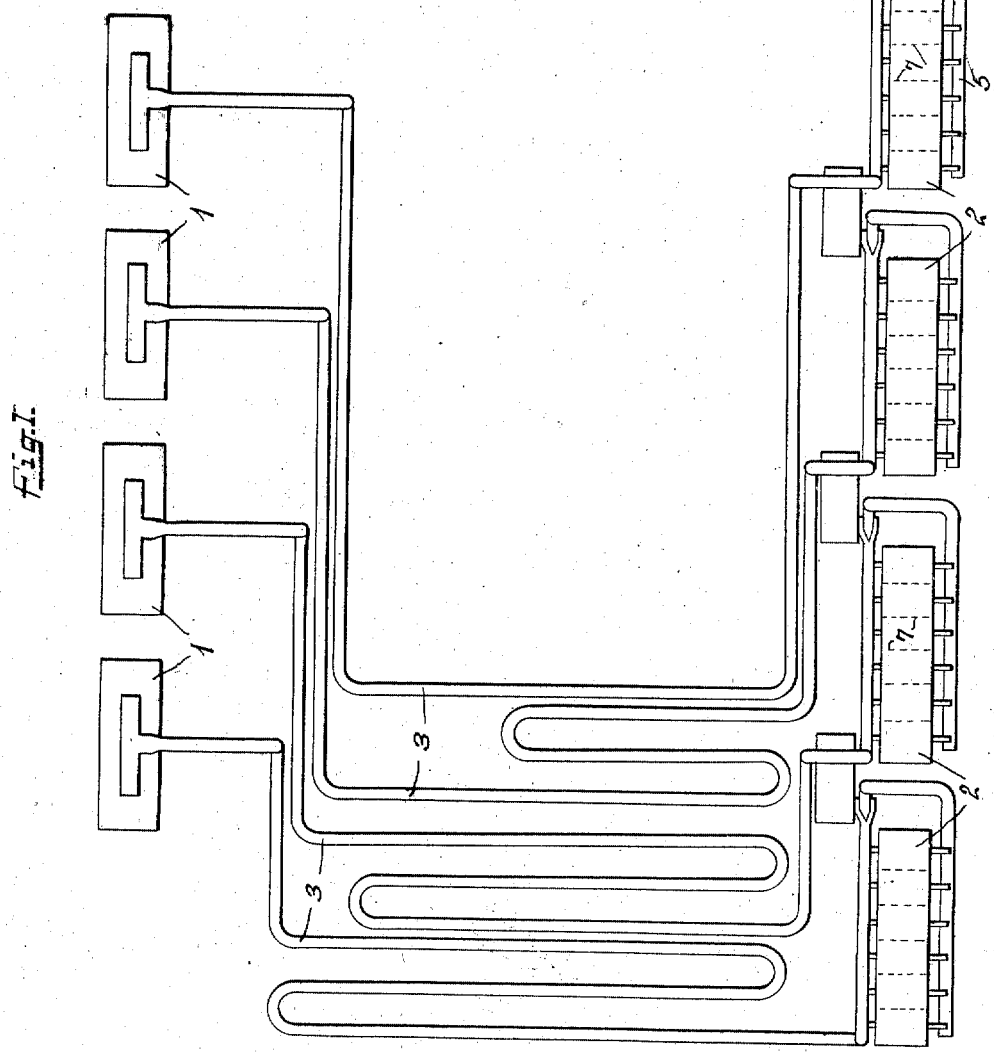

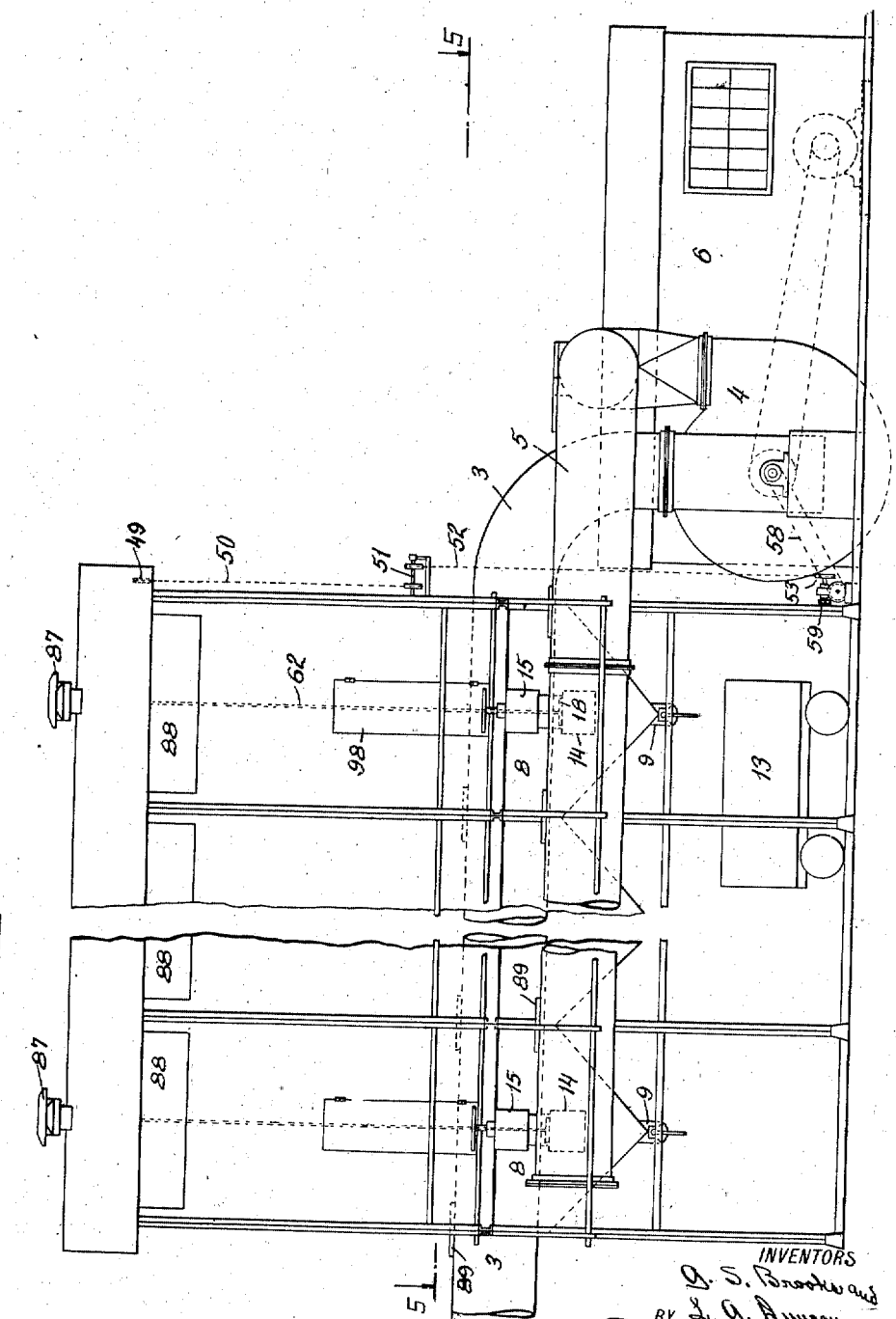

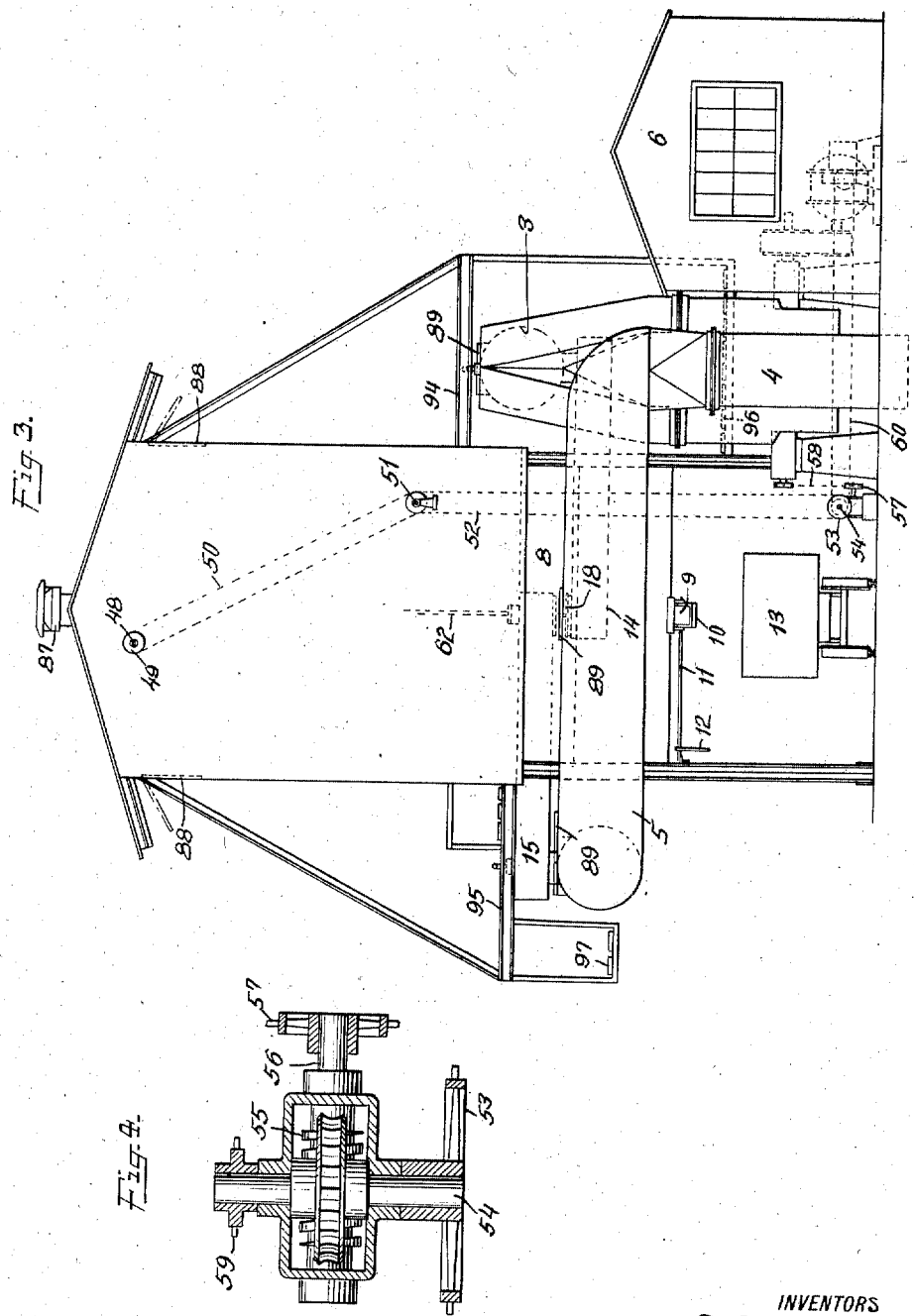

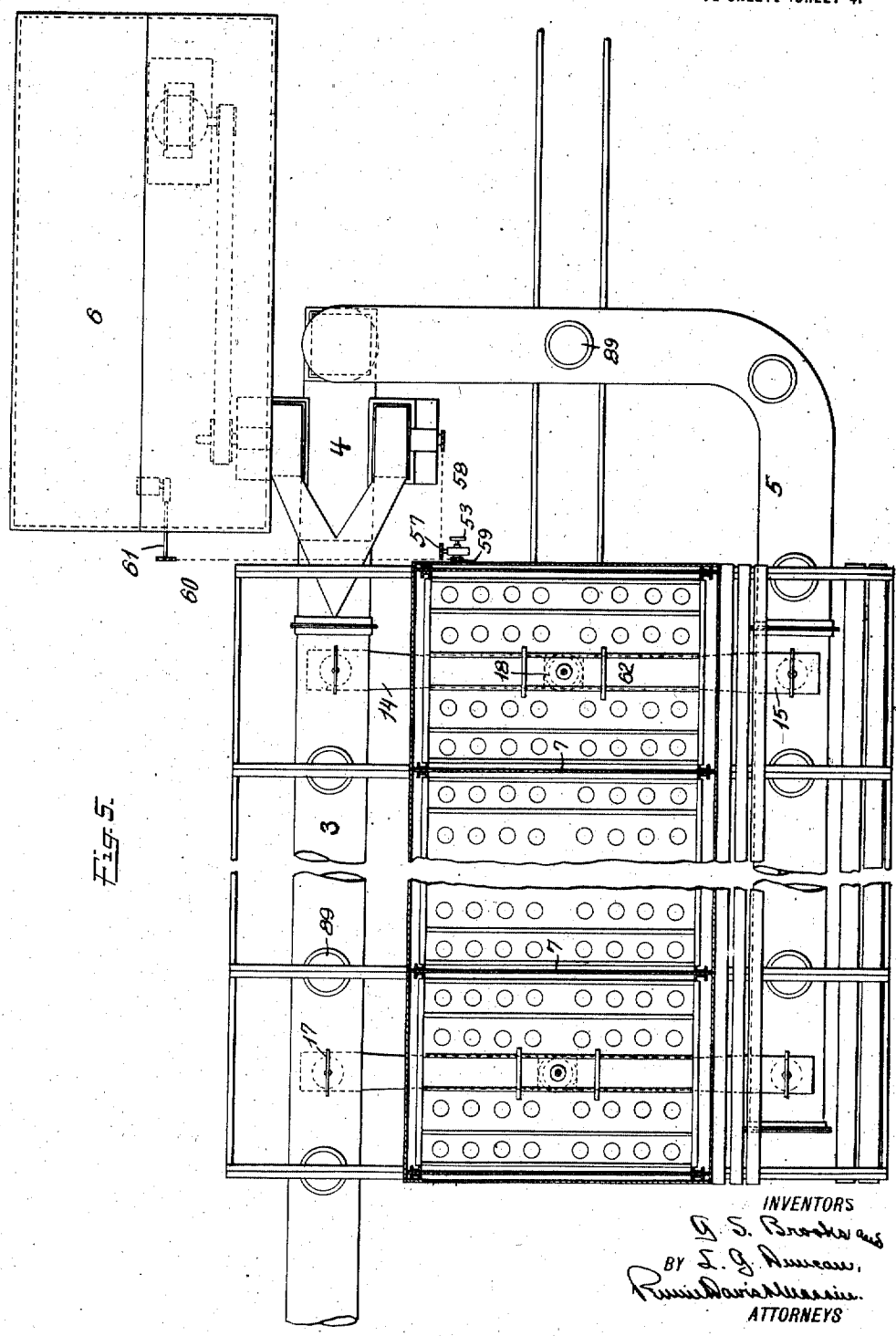

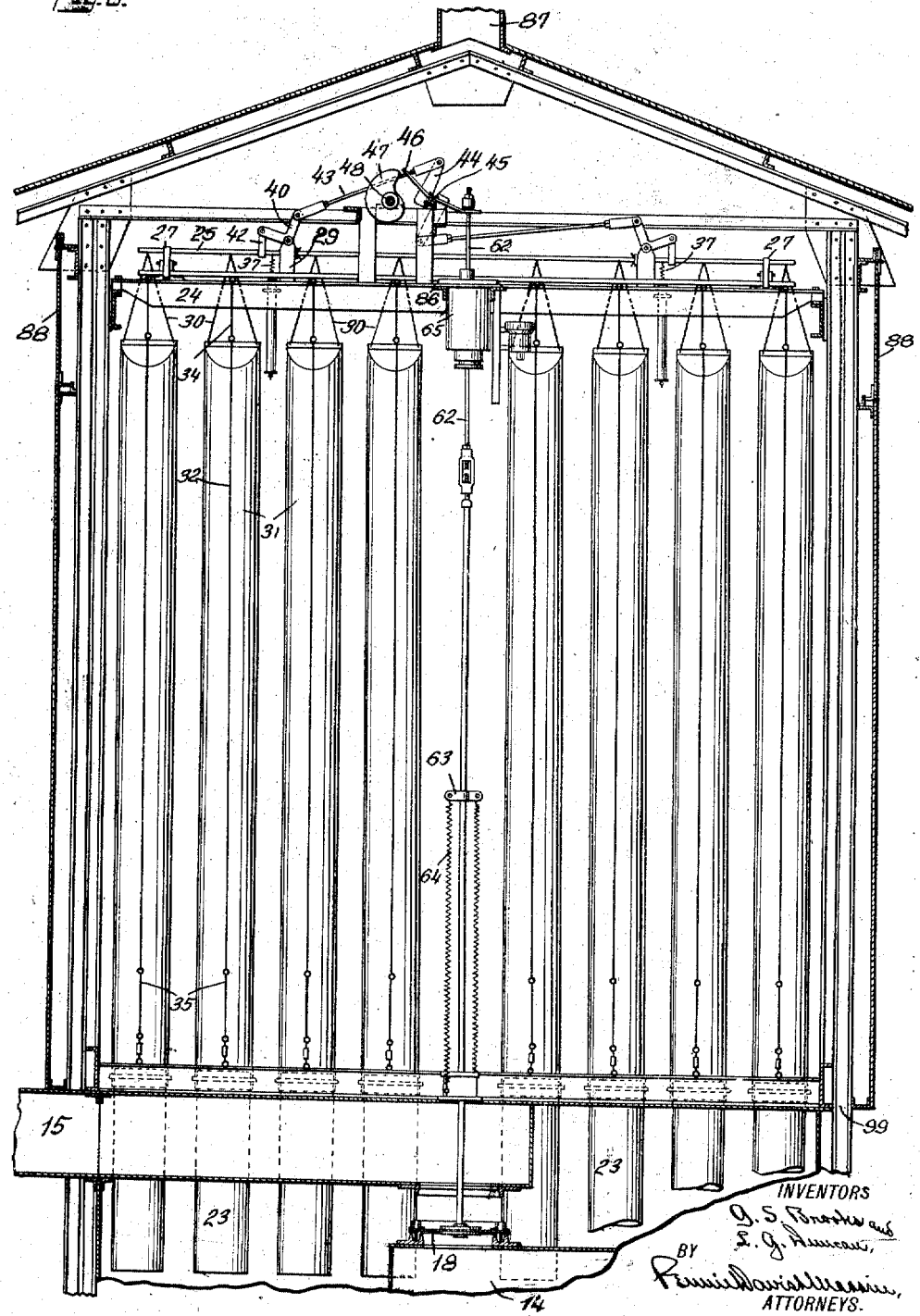

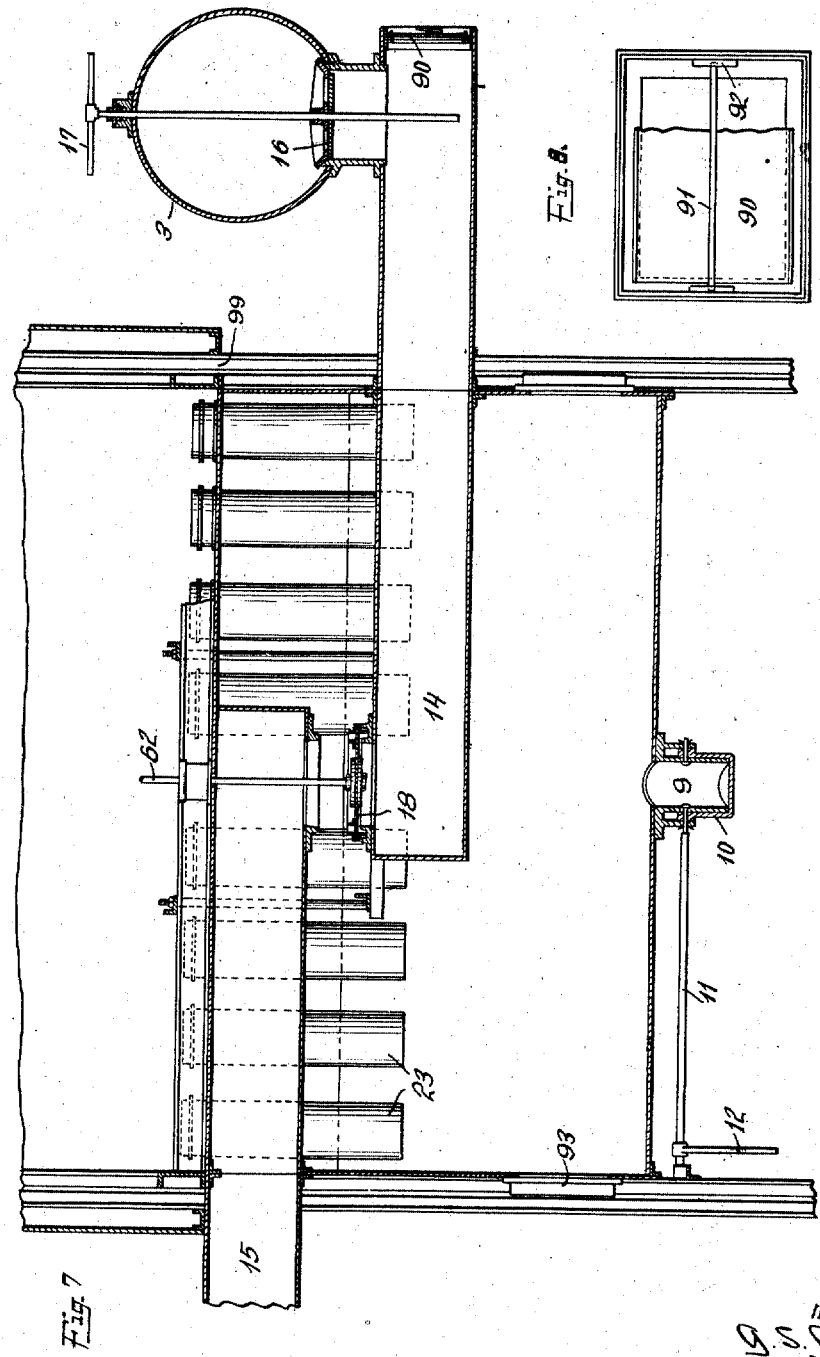

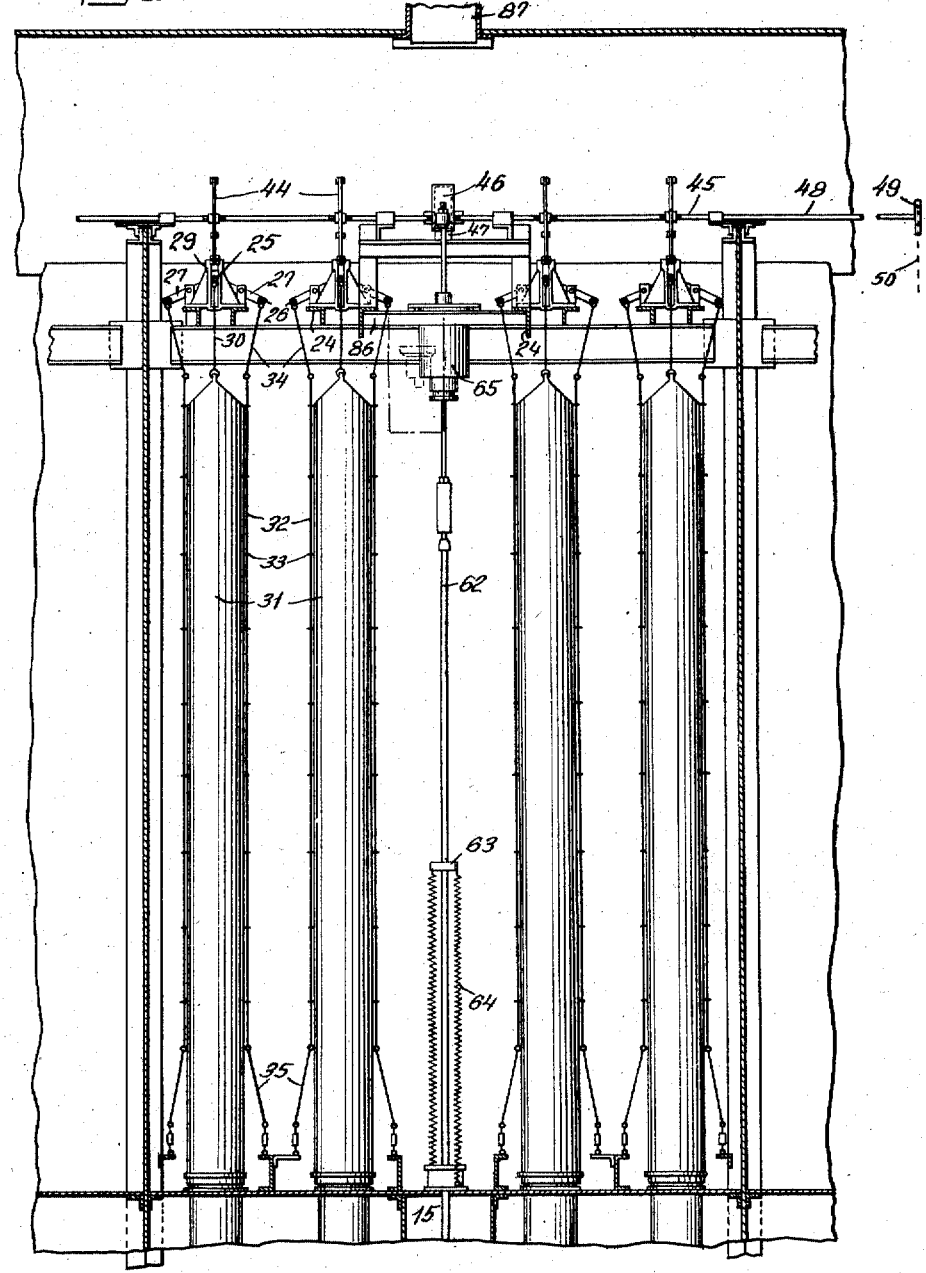

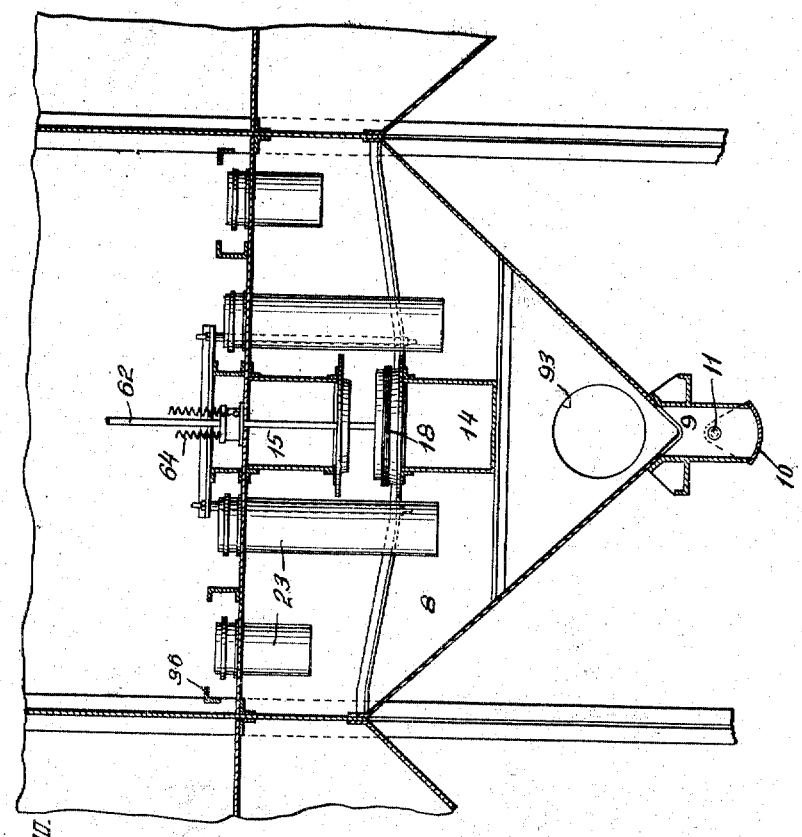

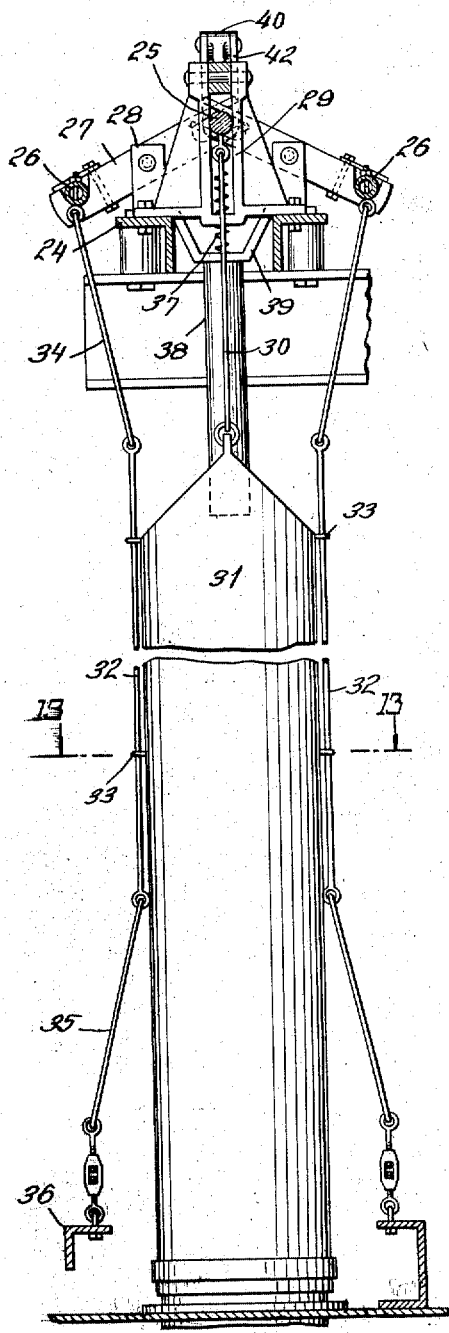
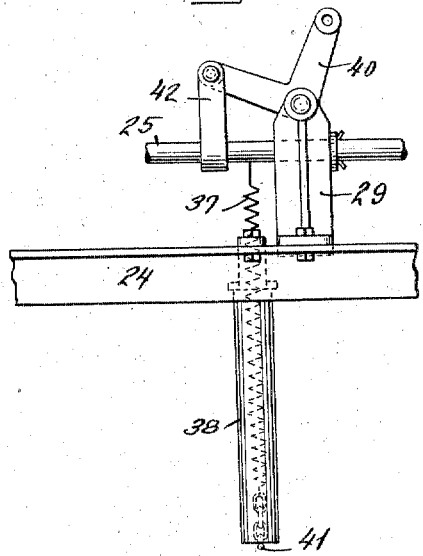
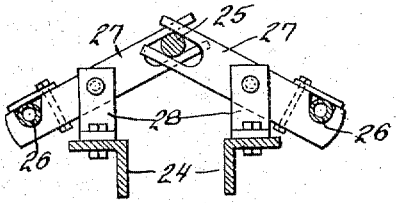
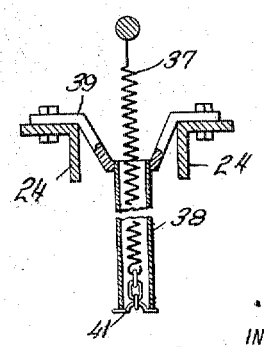

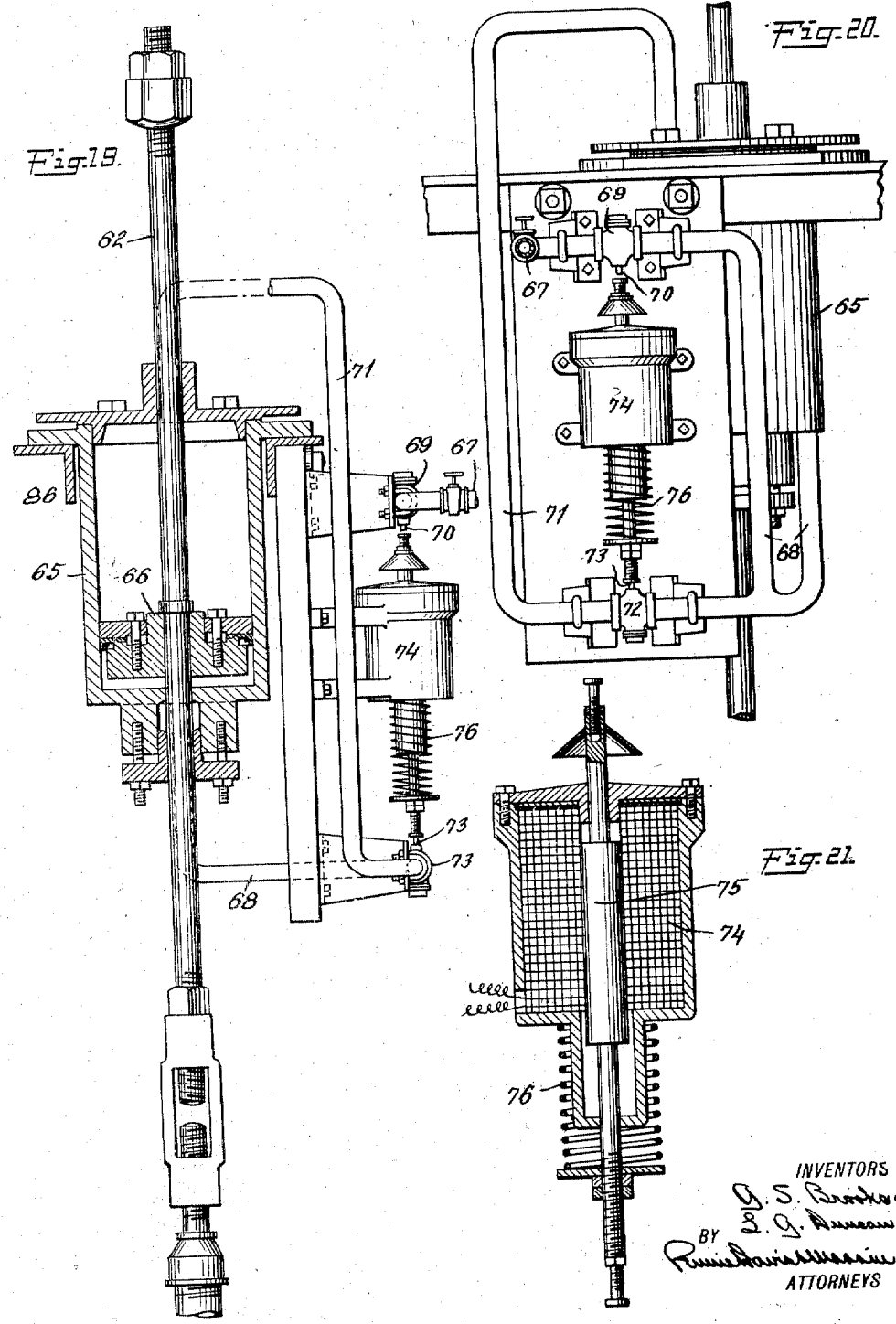

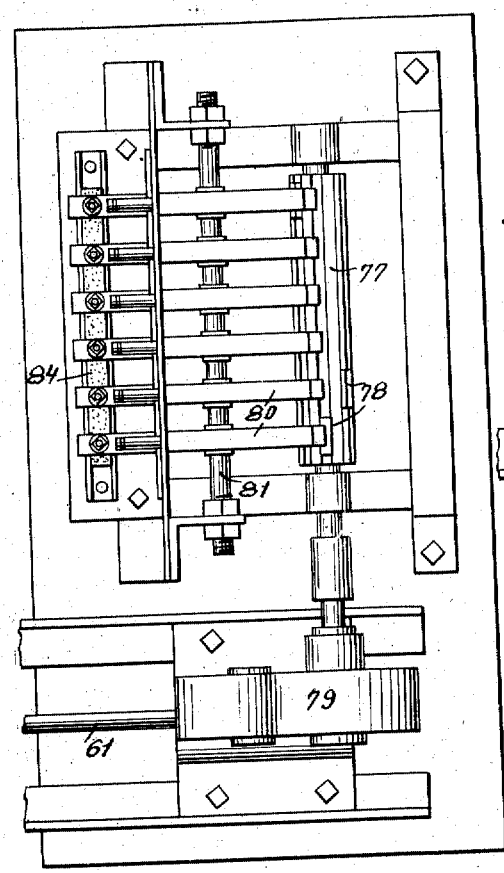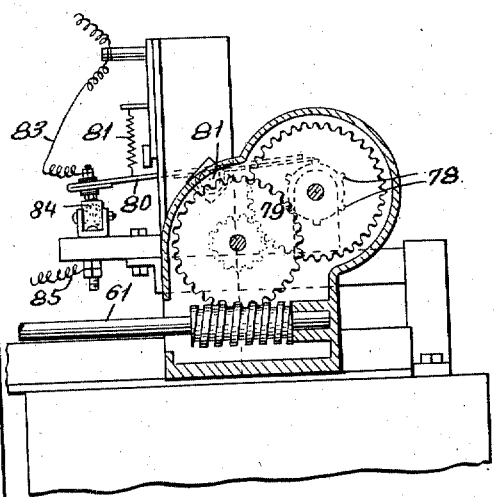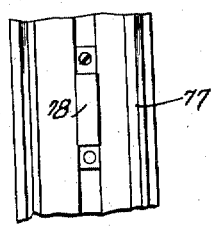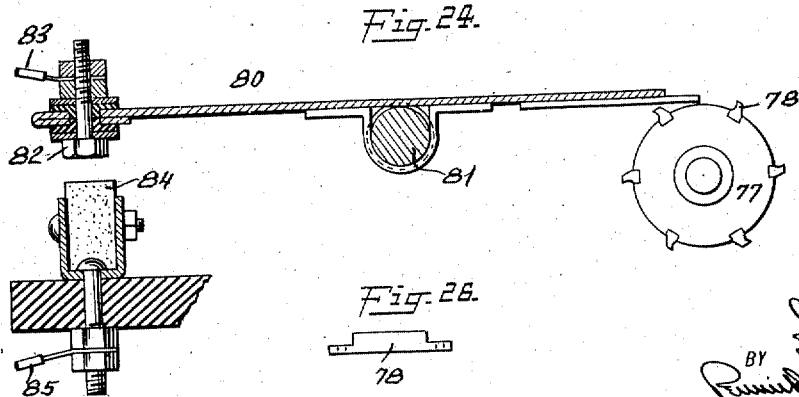

UNITED STATES PATENT OFFICE.

GEORGE SAGE BROOKS AND LAWRENCE GRANT DUNCAN, OF DEPUE, ILLINOIS, ASSIGNORS TO NEW JERSEY ZINC COMPANY, OF NEW YORK, N. Y., A CORPORATION OF NEW JERSEY.

FILTERING APPARATUS.

1,240,305.   Specification of Letters Patent.   Patented Sept. 18, 1917.

Application filed November 1, 1916. Serial No. 128,872.

*To all whom it may concern:*

Be it known that we, GEORGE SAGE BROOKS and LAWRENCE GRANT DUNCAN, citizens of the United States, residing at Depue, county of Bureau, and State of Illinois, have invented certain new and useful Improvements in Filtering Apparatus; and we do hereby declare the following to be a full, clear, and exact description of the invention, such as will enable others skilled in the art to which it appertains to make and use the same.

This invention relates to filtering apparatus of the type employing a plurality of filtering bags of muslin or other suitable fabric into which air or other gas is forced so that as the gas passes through the meshes of the fabric of the bags, solid particles carried by the gas will be caught. Such filtering apparatus is extensively used for removing fine particles of zinc oxid, cement, flour and other substances from air or other gases by which they are carried. In the operation of such apparatus, many of the particles caught by the fabric drop to the bottom of the bag or to a receptacle to which the bag is connected, but many particles become lodged upon the fabric of the bag and eventually the meshes of the fabric become so clogged that the gases do not pass through the fabric sufficiently freely.

Apparatus of this character has heretofore been provided with mechanism for shaking a bag at intervals in order to dislodge the particles which have collected upon the fabric. Also, provision has been made in filtering apparatus of this general character for reversing the direction of flow of the gases containing the solid particles so that air passing through the meshes of the filtering bags in the reverse direction will dislodge from the fabric the solid particles collected thereon. One of the features of the present invention involves the provision of an apparatus wherein both of these expedients are combined so that after the use of the apparatus has resulted in the collection of solid particles upon the bags, the direction of flow of gas through the fabric is reversed and at the same time the bags are shaken.

A simple and readily operated mechanism is provided for this purpose such that the reversal of the flow takes place at the commencement of the shaking operation and is discontinued immediately at the end of the shaking operation, the whole operation being automatic, being under the control of a single mechanism and being actuated from a single source of power.

The invention also includes the provision of an improved form of bag-shaking mechanism involving the employment of mechanical devices connected to the bags at a plurality of points distributed throughout their length through which the shaking of the bags is effected. The motion of this shaking mechanism is such that the bag is collapsed more or less and expanded alternately in rapid succession, as the movement of the bag material thus produced is a close approximation of the movement incident to shaking the bag by hand. This shaking motion is imparted to the bag by the mechanism employed for supporting the bag in position. In the preferred form, it consists of two rods extending lengthwise of the bag and connected to opposite sides of the bag at a plurality of points, together with mechanism for moving these rods toward and away from each other to collapse the bag and permit expansion thereof alternately. This movement of the rods may be conveniently effected by links connected to their ends and actuating mechanism operating through these links by a toggle motion to move the rods toward and away from each other. The bag may be supported in part by these rods but its principal support preferably consists of links connected to the upper portion of the bag at points displaced circumferentially of the bag from the points of connection of the rods thereto and in order to aid in securing the desired shaking movement of the fabric of the bag, these links are preferably lowered and raised in correspondence with the outward and inward movement of the rods.

Another feature of the invention involves the provision of a novel arrangement of the flues through which the gases to be filtered are conveyed to the bags, whereby a single blower serves to force the gas laden with the solid particles into the bag and to draw gas from the bag when reversal of flow through the meshes of the bag is desired. For this purpose, the flue through which the gas laden with the solid particles is conveyed to the bag, is connected to the bag by two ducts which enter the flue on opposite sides of the blower and valve mechanism is provided whereby either one of these two ducts may be opened for the passage of gas therethrough and the other closed. This valve mechanism is operated in conjunction with the bag-shaking mechanism, the valve being moved from one position to the other at the beginning of the bag-shaking movement and returned to its original position at the end thereof. When the valve mechanism is in one position, the blower acts to force the gases to be filtered into the bags under pressure and by merely changing the position of the valve mechanism, this operation of the blower is discontinued and instead the blower acts to draw the gases from the bags and thus draw air into the bags from the exterior thereof through the meshes of the bag material, which are thereby cleared of the solid particles lodged therein. The valve mechanism is caused to assume this latter position and maintain it throughout the operation of shaking the corresponding bag or bags so that while the bags are being shaken, the draft through the bag material is reversed. Furthermore, by this arrangement of the parts, a single blower will serve a plurality of filtering compartments, each provided with any desired number of bags.

Another feature of the invention involves the provision of a multiplicity of filter bags arranged in groups and automatic mechanism for shaking the bags of the several groups successively and each group independently of the several other groups. Preferably, a filter-bag house is provided divided into a number of compartments and in each compartment a plurality of bags are installed. Each compartment is provided with its own power operated shaking mechanism for shaking all of the bags in that compartment simultaneously and a controlling mechanism is employed whereby the several shaking mechanisms of the several compartments are operated successively. By reason of this construction, the power necessary for shaking the bags need only be sufficient for shaking the bags of one compartment and also the operation of filtering the gases is not interrupted as the operation continues in all of the several compartments except the one which is temporarily reversed relatively to the blower while the bags of that compartment are being shaken.

The invention also involves the provision of certain improvements in the ventilating system of a bag house to facilitate controlling the temperature around the bags. By properly regulating this temperature, the fabric of the bags is preserved. The filtering bags are of considerable length and are mounted in a vertical position within the bag house and the house or each of the several compartments therein is made in the form of a stack, the draft through which is controlled by suitable dampers arranged at either or both the inlets for air at the bottom of the stack or the outlets at the top.

These features of the invention and others whereby the bags are made easily accessible and visible for inspection, whereby the size of a filter house for a given filtering capacity is materially reduced, whereby the quantity of bag material required is reduced, whereby accurate shaking intervals are maintained, and whereby the presence of workmen within the filter house is made unnecessary except for special purposes, will be better understood by reference to the accompanying drawings which illustrate the preferred embodiment of the invention. It will be understood, however, that the features of the invention are not limited to the construction illustrated in the drawings; on the contrary, the several features of the invention may be employed either individually or in combination and in various forms differing widely as to their structural characteristics.

Figure 13:
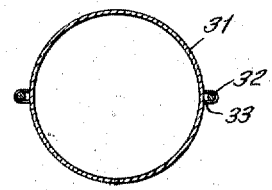
Figure 14:
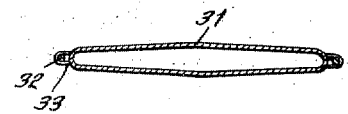

In the drawings, Figure 1 is a plan view of an installation of furnaces and filter houses and the connections between them; Fig. 2 is an elevation of one of the filter houses and the power house connected thereto, the filter house being broken away in part; Fig. 3 is an end view of the filter house and power plant; Fig. 4 is a detail view of certain of the operating mechanism hereinafter referred to; Fig. 5 is a horizontal section through the filter house, the section line being the line 5—5 of Fig. 2; Fig. 6 is a transverse section of the filter house; Fig. 7 is a transverse section showing the parts shown at the lower portion of Fig. 6 and those lying directly below them; Fig. 8 is a detail view showing one of the doors through which the collected solid particles are removed; Figs. 9 and 10 together constitute a longitudinal sectional view of a portion of the filter house showing one of the compartments into which the house is divided; Fig. 11 is a detail view showing the valve controlling the admission of the gases to the filter bags of one compartment; Fig. 12 is a plan view of one compartment of the filter house showing the bags therein and the shaking mechanism therefor; Figs. 13 and 14 are sectional views showing one of the bags in its expanded and collapsed condition; Fig. 15 is an elevation of one of the bags showing a portion of the shaking mechanism of the bag in section; Figs. 16, 17 and 18 are detail views of portions of the shaking mechanism; Fig. 19 is a sectional view of the mechanism for controlling the shaking mechanism of one of the compartments and operating the valve of that compartment; Fig. 20 is a view of the electrical operating device for the mechanism shown in Fig. 19; Fig. 21 is a longitudinal section of the solenoid operating device shown in Figs. 19 and 20; Fig. 22 is a plan view of the controller for the solenoids of the several compartments; Fig. 23 is a sectional elevation of the mechanism shown in Fig. 22; Fig. 24 is a sectional detail view of a portion of the mechanism shown in Fig. 22; and Figs. 25 and 26 are detail views of the commutator shown in Fig. 22.

Fig. 1 illustrates an arrangement of furnaces and filter-bag houses which may be employed in producing zinc oxid. Four furnaces are indicated at 1 and four bag houses are indicated at 2. Each furnace is connected to its bag house by a flue 3 and these flues are preferably elongated so that the gases passing therethrough and the solid particles carried by the gases will become cooled before they enter the bag houses. Each bag house is divided into a number of compartments, six in the present instance, and the flue 3 carrying the gases to that bag house passes along one side of the house. At the end of the house a blower 4 is connected in the flue 3 for effecting the passage of the gases through the flue and into the bags in the bag house. Beyond the blower, the flue 3 is extended by a flue 5 which passes along the opposite side of the bag house. The blower is operated by a motor located in a power house indicated at 6.

Figs. 2, 3 and 5 show the bag house with the flue 3 extending along one side of it to the inlet port of the blower 4 and the flue 5 extending from the outlet port of the blower to and along the opposite side of the bag house. The blower is shown as driven by a belt from a motor located within the power house 6. The partitions dividing the filter house into compartments are indicated at 7. Under each compartment is a receptacle 8, the bottom of which is formed by two inclined walls forming a trough. At the bottom of this trough is an outlet 9 (Figs. 7 and 10) provided with a hinged gate 10 which is fixed to a rock shaft 11 having a handle 12 thereon. The several receptacles 8 are mounted in an elevated position upon the framework of the filter house so that a car 13 may pass under them on suitable rails. When the car is under a receptacle, the gate 10 of the outlet of that receptacle may be moved by its handle 12 to permit the solid particles which have collected in that receptacle to pass downward into the car.

Each of the receptacles 8 is provided with two connections to the flue for carrying the gases to be filtered, these two connections leading to the flue on opposite sides of the blower. These two connections are indicated at 14 and 15 and they are shown best in Fig. 7. The connections or ducts 14 extend out through the sides of the receptacles 8 and project under the flue 3 to which they are connected. A valve 16 is provided at the connection of each duct 14 to the flue 3, this valve being operated by a handle 17 which passes through a suitable stuffing box. The connections or ducts 15 pass out through the opposite side walls of the receptacles 8 and project over the extension 5 of the flue 3 to which they are connected in a similar manner, a valve being provided at the point of connection to the flue as indicated in Fig. 5. The inner ends of the ducts 14 and 15 overlap and openings are provided in the upper side of the duct 14 and the lower side of the duct 15, these two openings being in alinement. A valve member 18 is provided as shown in Fig. 7 movable to the position in which it is shown in that figure for closing the opening in the duct 14 and to a position in which it closes the opening in the duct 15. Fig. 11 shows this valve member 18 and the parts associated therewith on an enlarged scale. As will be seen from that figure, the upper side of the valve member is provided with an annular trough 19 adapted to contain a sealing means, such as a liquid, powdered or pulverulent material, and around the opening of the duct 15 is a lip 20, which, when the valve member 18 is raised, enters the trough 19. Also, around the opening in the duct 14 is an annular trough 21 adapted to contain a sealing means and the lower side of the valve member 18 is provided with a lip or flange 22 adapted to enter the trough 21. It will be seen therefore, that, when the valve members 18 are in the position shown in the Figs. 7 and 11, gases laden with solid particles may enter the receptacles 8 through the ducts 15 after passing through the flue 3, blower 4 and flue 5 to the ducts 15. When the valve members 18 are raised to their upper positions, these connections from the flue 3, through the blower flue 5 and ducts 15 to the receptacles 8, are closed and the receptacles 8 are connected to the flue 3 by the ducts 14. In other words, the connections from the flue 3 to the receptacles 8 by way of the ducts 15 include the blower, whereas the connections from the flue 3 to the receptacles 8 by way of the ducts 14 do not include the blower.

In each compartment of the filter house are a plurality of filter bags, arranged vertically and preferably of considerable length. In the present instance, thirty-two bags are shown as provided in each compartment, these being arranged in four rows of eight each. All of the bags are closed at their upper ends and their lower ends are fitted over and bound to the upper ends of short lengths of tubing 23 passing through the top walls of the receptacles 8. Extending across the top of each compartment are four pairs of beams 24, each pair constituting the supporting structure for one row of eight bags and the shaking mechanism for those bags. A rod 25 is supported on each pair of these beams as hereinafter described and each of the eight bags of a row is suspended from this rod 25 by two links 30 which are connected to the upper end of the bag at diametrically opposite points. Fig. 5 shows several of the compartments each having four rows of bags therein and eight bags in each row. Fig. 12 also shows the arrangement of the bags in a compartment and this figure also shows the pairs of beams 24 overlying the bags of a row and the rod 25 from which the bags are suspended. This rod 25 extends parallel to the beams 24 and lies over the center of the space between them. On opposite sides of each rod 25 are two rods 26, each connected at each of its ends to the rod 25 by a lever 27. Each lever 27 is pivotally mounted upon one of the beams 24 by means of a standard 28 mounted upon the beam 24 and having the lever 27 pivoted therein. These parts constitute two rectangular frames pivotally connected at their adjacent edges and each pivotally mounted upon one of the beams 24. Figs. 15 and 17 show this mechanism on an enlarged scale. The levers 27 are shown in these figures pivotally mounted in the standards 28 which are secured upon the beams 24 and at their outer ends the levers 27 carry the rods 26. The inner ends of the levers 27 are bifurcated and straddle the rod 25. This rod is adapted to move vertically as the levers 27 are rocked and it is guided in its vertical movement by vertically disposed slots in standards 29 which are secured upon the beams 24. Fig. 15 shows one of the links 30 by which the bag 31 is suspended from the rod 25.

A pair of rods 32 extend along opposite sides of the bag 31 at points 90° displaced from the points of attachment of the links 30 to the bag 31. These rods 32 pass through eyes 33 secured to the bag 31 at intervals throughout the length of the bag. At its upper end each rod 32 is connected by a link 34 to the overlying rod 26 of one of the rocking frames. At its lower end each rod 32 is connected by a link 35 to a stationary portion 36 of the supporting structure, a turn-buckle being provided in this connection for adjusting its length. It will be noted that the links 34 and 35 and the rods 32 together with the rocking frames, constitute toggles such that when the frames are rocked to raise the rods 26, the parts 34, 32 and 35, will be brought more nearly into alinement; in other words, the two rods 32 of the bag 31 will be moved away from each other, thus drawing the bag out to a collapsed condition such as is indicated in Fig. 14. At the same time that the rods 26 are raised to cause this collapse of the bag, the rod 25 is depressed, thus lowering the links 30 and the portions of the bag to which those links are connected, and in this way facilitating the collapse of the bag. When the rocking frames are rocked in the opposite direction, the links 30 are raised and the lowering of the links 34 permits the rods 32 to move toward each other whereupon the bag is expanded so as to assume its original condition.

The two rectangular frames including rods 25 and 26 which are movable to effect the shaking of the bags 31 are rocked in one direction by springs acting to draw the rod 25 downward and in the other direction by a power shaft acting to raise the rod 25 against the tension of these springs. For this purpose each rod 25 has two springs 37 connected to it and extending downward from it, as shown in Figs. 6, 16 and 18. Each spring 37 extends through a tubular guide 38 depending from a bracket 39 (Figs. 15 and 18) extending between the beams 24. The end of spring 37 is connected to a few chain links and a bar 41 extends through one of these links to anchor the spring to the end of the tube 38. The chain links provide means for adjusting the tension of spring 37 as desired.

For raising each rod 25 against the tension of its springs 37, two bell crank levers 40 (Figs. 6 and 16) are provided pivoted in standards 29 mounted upon the beams 24. Each of these bell crank levers 40 has one end connected by a link 42 to the rod 25. The opposite ends of the bell cranks 40 are connected by links 43 to crank arms 44 upon a rock shaft 45. Thus, when the shaft 45 is rocked in one direction, the two connections 44, 43, 40, 42, from the rock shaft 45 to the rod 25 operate to raise the horizontally disposed rod 25 vertically, thus rocking the two rectangular frames consisting of rod 25, the two rods 26 and the four pivoted levers 27. Then, when the means for rocking the shaft 45 in that direction releases the shaft, the rod 25 is pulled downwardly by its springs 37, thus actuating the parts 42, 40, 43, 44 and 45 in the opposite direction. For rocking the shaft 45, the latter is provided with an arm 46 adapted to be engaged by a cam 47 on the power shaft 48. From Fig. 6, it will be seen how the shape of this cam 47 and the coöperation of the cam with the arm 46 serve to rock the shaft 45 and raise rod 25, and thereafter permit the rod 25 to be lowered, restoring shaft 45 to its former position.

The power shaft 48 extends lengthwise of the filter house the entire length thereof. Its end projects through the end wall of the filter house, as shown in Figs. 2, 3 and 9, and carries a sprocket wheel 49. This wheel and the shaft 48 are driven by a chain 50 which runs on a sprocket wheel on a countershaft 51. Another sprocket wheel on this counter-shaft receives a chain 52 which also runs on a sprocket wheel 53, shown in detail in Fig. 4. The shaft 54 of this sprocket wheel carries a worm wheel 55 which meshes with a worm on a shaft 56 carrying a sprocket 57. This sprocket is driven by a chain 58 (Fig. 5) from a sprocket wheel on the shaft of the blower. The shaft 54 also carries a sprocket wheel 59 which receives a chain 60 for driving a shaft 61 of the commutator as hereinafter described. By means of these connections, the power shaft 48 extending lengthwise of the filter house along the top thereof is rotated continuously whenever the blower is in operation, that is, whenever the filtering apparatus is in use.

Normally, the rock shaft 45 is held in such a position that its arm 46 does not come in contact with the cam 47 as the latter rotates. When it is desired to shake the bags of a compartment, the rod 25 of that compartment is released, and is drawn downward by its springs 37, thus acting through the parts 42, 40, 43 and 44 to rock the shaft 45 and carry the arm 46 down into engagement with cam 47. In order to hold arm 46 in its inoperative position, that arm is extended to the other side of shaft 45 and coöperates with an adjustable stop on a rod 62 which extends down to the base of the compartment and carries the valve member 18. This rod 62 is provided with a cross-head 63 and a pair of springs 64 are connected at their upper ends to this cross-head and at their lower ends to one of the frame members at the base of the compartment so that these springs 64 normally act to draw the rod 62 downward. When they do so, they act through the arm 46 to rock shaft 45 and raise the rod 25 against the tension of the springs 37. The rod 62 has a turn-buckle therein for adjusting its length and the stop at its upper end which coacts with the arm 46 is also adjustable so that proper coöperation with the bag shaking mechanism may be secured and so that the magnitude of the bag shaking movement effected by cam 47 and springs 37 may be adjusted as desired.

In order to move the rod 62 upward against the tension of its springs 64, a piston is provided upon the rod adapted to reciprocate within a cylinder 65 suspended from cross braces 86 secured at their ends to two of the beams 24, as shown in Figs. 6, 9 and 12. The details of this piston and cylinder and the parts associated therewith are best shown in Figs. 19, 20 and 21. The piston is shown at 66 secured to the rod 62 and movable within the cylinder 65. The piston is actuated by fluid under pressure supplied thereto from a supply pipe 67. From this pipe, a pipe 68 leads to the bottom of the cylinder 65 and in this pipe is a valve 69, the movable member of which is normally held upon its seat by a spring. The valve member of the valve may be raised from its seat by upward movement of the stem 70 of the valve which projects out through the valve casing. For permitting the exhaust of the actuating fluid from the lower end of the cylinder 65, the pipe 68 is provided with a branch pipe 71 having a valve 72 therein. The movable member of this valve is also held normally upon its seat by a spring and the valve member may be moved from its seat by downward pressure upon the stem 73 of the valve. In the drawings, the pipe 71 is shown as connected to the upper end of the cylinder 65 to provide for the transfer of the actuating fluid from one end of the cylinder to the other. However, when compressed air is used as the actuating fluid, the pipe 71 leading to the upper end of the cylinder may be omitted so that air passing through valve 72 is exhausted to the atmosphere, in which case an opening would be provided in the top of the cylinder 65 to permit the entrance of air into the upper portion of the cylinder when the lower portion of the cylinder is connected to atmosphere. For actuating the two valves 69 and 72, a solenoid 74 is provided. The core 75 of this solenoid is normally drawn downward by a spring 76 connected thereto and when so drawn downward the core 75 engages the stem 73 of valve 72 so as to hold that valve open. Under such circumstances the rod 62 is drawn downward by its springs 64 to the position in which the valve member 18 is lowered to its Fig. 6 position and in which the bag shaking mechanism is held inoperative. In order to actuate the valve shaking mechanism, the solenoid 74 is energized as hereinafter described and operates to raise the core 75. When the core is so raised, it engages the stem 70 of the valve 69 and opens that valve and disengages the stem 73 of valve 72 so as to allow that valve to close. Under these conditions fluid under pressure passes from the supply pipe 67 through valve 69 and pipe 68 to the lower end of cylinder 65 and raises the piston 66 and with it the rod 62. This moves the valve member 18 from its lower to its upper position and releases the bag shaking mechanism so that the latter is operated by the combined action of the springs 37 and the power shaft 48.

The bag shaking mechanism above described, together with the actuating mechanism shown in Figs. 19, 20 and 21, and the valve member 18 movable at the beginning and at the conclusion of the bag shaking operation, are provided in each of the several compartments of the filter house. As above stated, in the present instance the filter house includes six of these compartments, each provided with thirty-two bags. It would be undesirable to effect the shaking of all the bags in the filter house at once as that would involve discontinuance of the filtering operation temporarily and also would require a considerable amount of power. Provision is therefore made in the apparatus illustrated in the drawings for operating the shaking mechanism of the several compartments successively so that the power required need only be sufficient for operating one shaking mechanism and so that while the bags of one compartment are being shaken, the filtering operation will proceed in all the other compartments. The operation of any shaking mechanism is dependent upon the energization of the solenoid 74 corresponding thereto and therefore means are provided for so closing the circuits through the solenoids 74 of the several compartments that no two of these may be closed at the same time. Preferably, a controller or commutator is employed for this purpose and so arranged that the solenoids 74 of the several compartments will be closed in a regular succession with the desired time intervals between and held closed for the desired length of time. This is accomplished by means of the mechanism shown in Figs. 22 to 26. In these figures a controller or commutator cylinder 77 is provided having a plurality of lengthwise grooves therein each of which is adapted to receive a commutator segment 78. These segments 78 are adapted to be secured in position by means of screws as indicated so that the proper one may be removed when the use of one of the compartments is to be discontinued temporarily. The cylinder 77 is mounted for rotation and is rotated through speed reducing gearing 79 from the shaft 61 heretofore referred to as being driven from the shaft of the blower. Each of the segments of the controller 77 is adapted to coöperate with a pivoted arm 80, the several arms 80 being mounted upon a shaft 81 so as to rock thereon. The rear end of each arm 80 is normally held up by a spring 81 (Fig. 23) to hold the opposite end of the arm down upon the surface of the cylinder 77 and the passage of the segment 78 corresponding to that arm under the end of the arm serves to rock the arm upon its shaft. The rear end of each arm 80 carries a contact 82 insulated from the arm 80 and electrically connected to a wire 83 which leads to one of the terminals of the corresponding solenoid 74. The several contacts 82 are adapted to engage a carbon contact 84 mounted upon the base of the controller. This carbon contact 84 is connected by wire 85 to one terminal of all of the solenoids 74, a battery being included in this circuit. Thus, as the controller cylinder 77 is rotated, circuit is closed by the segments 78 through one after another of the circuits of the solenoids 74 and each of these circuits when closed is held closed for a definite length of time, depending on the width of the segments 78 and the speed of rotation of the cylinder 77. When any solenoid circuit is closed, the shaking mechanism of the compartment to which that solenoid corresponds is set in operation and its operation is continued until the circuit is broken by the passage of the segment 78 from under the end of the arm 80.

As will be noted from Figs. 2, 3 and 5, the portion of the filter house inclosing the bags is a closed structure except for inlet openings at the lower end thereof and outlet openings at the top. One or more outlets 87 are provided at the center of the roof and along the top of each side wall are a plurality of openings provided with hinged doors 88. The openings at the lower end of the bag compartments are indicated at 99 in Figs. 6 and 7. Each compartment of the filter house is provided with a door 98 through which access may be had to the interior.

The various parts of the apparatus through which the gases to be filtered pass are provided with numerous openings and closures therefor, so that the solid particles collecting therein may be readily obtained and the parts of the apparatus suitably cleaned. Thus, the flue 3 and its extension 5 are shown as provided with doors 89 at intervals throughout their length. Each of the ducts 14 and 15 is also provided with a door at its outer end. A construction which may be employed for such a door is shown in Fig. 8. The door 90 is rectangular in shape and is adapted to fit over a rectangular opening in the end of the duct 14. The door is held in position firmly against its seat by means of a rod 91, the ends of which are adapted to coöperate with inclined walls upon blocks 92 secured to the door frame. In this way the door may be readily held upon its seat so tightly as to prevent the air around the door from entering, a suitable packing being preferably provided between the edge of the door and its seat. Each of the receptacles 8 is also provided with doors 93 at its ends, as shown in Figs. 7 and 10.

Preferably, the filter house structure includes galleries arranged as indicated in the drawings to give ready access to the different portions of the apparatus and particularly to the doors through which the withdrawal of collected solid particles is effected. As shown in Fig. 3, galleries 94 and 95 are provided extending along the sides of the filter house above the flues 3 and 5. From the gallery 94 a second gallery 96 is suspended below the flue 3. A gallery 97 is suspended from the gallery 95 extending along the flue 5 from which ready access may be had to the doors over the openings in the flue 5.

The operation of the apparatus thus constructed will now be described. The furnaces shown in Fig. 1 supply fumes carrying solid particles to the flues 3 where the gases and particles are cooled and through which the gases and particles are caused to flow by the blowers 4 to which the flues 3 are connected. These blowers force the gases through the extensions 5 of the flues 3 and through the ducts 15 into the receptacles 8 of the filter houses and up through the connecting tubes 23 to the bags. Under normal operating conditions, the valve member 18 of each receptacle is in its lowermost position closing the opening from the duct 14 to the receptacle 8 and opening the outlet from the duct 15 into the receptacle 8. The gases therefore enter the receptacles 8 through the ducts 15 under a light pressure created by the blower and pass up into the bags, the gases passing outward through the bags and the particles carried thereby being retained within the bags. While the apparatus is in operation, the rotation of the blower causes a slow rotation of the cylinder 77 of the controller. Therefore, at angular intervals throughout the operation of the apparatus the controller effects the closure of the circuit of one of the solenoids 74 and holds this circuit closed for a definite length of time. When the circuit of any solenoid is closed, the core of that solenoid is raised against the tension of its spring 76, thus opening the valve 69 and permitting the closure of the valve 72. When this occurs, fluid under pressure passes from pipe 67 through valve 69 and pipe 68 to the lower end of the cylinder 65 and it acts upon the piston 66 to raise that piston and the rod 62 to which it is connected. The raising of rod 62 thus against the tension of its springs 64 carries the valve member 18 from its lower position, closing the opening to duct 14, to its upper position, closing the opening to duct 15. Thus, the passage through which the gases are supplied to the receptacle 8 and bags 31 by the blower 4 is closed but a passage independent of the blower is provided from the receptacle 8 to the flue 3 by way of the duct 14. Also, the raising of rod 62 releases the arm 46 on the rock shaft 45 so that the springs 37 are free to rock the four frames each consisting of a rod 25, rods 26 and pivoted levers 27. This rocking movement effected by springs 37, is a downward movement of each rod 25 and an upward movement of the rods 26. As rod 25 moves downward, the links 30 move downward with it, thus releasing the hold on the portions of the bags 31 to which the links 30 are connected. As the rods 26 move upward, the links 34 suspended therefrom are drawn up, resulting in moving the parts 34, 32 and 35 more or less into alinement and moving the rods 32 of each bag away from each other. As this movement occurs, the shaft 45 is rocked, carrying the arm 46 down upon the periphery of cam 47, which cam is continuously rotated by the shaft 48. The rotation of the cam therefore acts through the parts 46, 45, 44, 43, 40 and 42 to rock the frames consisting of the parts 25, 26 and 27 back to their initial positions against the tension of springs 37. This pulls up on the links 30 of each bag and lets down on the links 34 of each bag so that the two rods 32 of each bag may move toward each other. This action takes place rapidly in correspondence with the rotation of the cam 47, the movement in one direction being effected by the springs 37 and the movement in the other direction being effected by the cam 47 and power shaft 48. Thus, each bag is subjected to repeated collapse and expansion by means of mechanical devices connected to the bag and serving as the supports for the bags. The toggle action of the mechanism causes the rods 32 connected to opposite sides of the bag to move away from each other and as this movement takes place, the connections to the bag at points intermediate of the rods 32 are relaxed so that these connections to the bag will not oppose the collapsing movement of the bag. The bag therefore collapses to a condition approximating that indicated in Fig. 14. Then on reversal of the movement of the parts, the rods 32 are permitted to approach each other and at the same time the connections through the links 30 to points on the bag intermediate the rods 32 are drawn up so that the bag is once more caused to assume a substantially circular condition, as shown in Fig. 13. The shifting of the valve member 18 immediately preceding the shaking of the bags so as to cut off the connection to the bags through the duct 15 and establish connection to the bags through the duct 14, changes the connections between the bags and the blower so that the latter, instead of forcing gases laden with solid particles into the bags, acts to draw the gases in the bags out through the duct 14 and into the flue 3. In other words, the direction of flow within the bags is reversed and air is drawn through the meshes of the bags from the outside thereof so as to assist in dislodging solid particles which have collected upon the bags. This reversal of the direction of flow through the bags continues throughout the period of operation of the shaking mechanism so that the dislodging of particles collected upon the bag is effected by the joint action of shaking the bag material and causing the flow of air from the outside of the bag to the interior thereof. The meshes of the bag material are thereby cleared of solid particles thoroughly and in a very short time. Furthermore, the relieving of the pressure within the bag by this change of the connections between the blower and the bag facilitates the shaking operation since the bag is thus enabled to collapse more freely. The shaking operation is repeated as long as the energization of solenoid 74 is continued and when the circuit of the solenoid is opened, the springs 64 together with the weight of the rod 62 and the parts carried thereby cause the rod and the piston 66 to move downwardly. This movement of the rod and piston is permitted because, when the solenoid is deënergized the core 75 drops, resulting in closure of valve 69 and opening of valve 72; the compressed fluid in the lower end of piston 65 may then escape or pass into the upper part of the cylinder through pipe 68, valve 72 and pipe 71. This downward movement of rod 62 acts through arm 46 to rock the shaft 45 and raise the rod 25 and hold the latter in the raised position, the tension of springs 37 being overcome by the tension of springs 64 and the weight of rod 62. Also, this downward movement of rod 62 carries the valve member 18 to the position for opening the duct 15 and closing the duct 14, whereupon the suction of gases from the bags through the duct 14 is discontinued and the gases are forced by the blower through the duct 15 into the bags and the filtering operation continues as before. Thereafter, the rotation of the controller cylinder closes circuit through the solenoid of the next compartment and the shaking operation, together with the reversal of the flow through the bags of that compartment, are repeated therein in the manner above described. The operation continues thus in the several compartments in succession throughout the period of operation of the plant, each shaking mechanism being operated for a definite time and the filtering operation being continued in all of the compartments other than the one in which the shaking mechanism is being operated and in which the direction of flow through the bags is reversed.

The valves 16 controlling the connections of the ducts 14 and 15 to the flue 3 and its extension 5 are normally more or less open, the positions of these valves being controlled by their handles 17 which pass through stuffing boxes to positions convenient for their manipulation. These valves may be adjusted to a more or less open position so as to establish the desired conditions of pressure and suction in the bags of each compartment. Also, it will be noted that the construction of the valve member 18 and its coöperating parts is such that a gastight closure is effected in each of the two positions of this valve member. The stem of the valve member, that is the rod 62, passes through a stuffing box at the top of the duct 15, as is indicated in Fig. 11.

It will be noted that each of the several compartments is completely closed except for inlet openings 99 at its lower end and outlet openings at the top controlled by doors 88. Because of this and the considerable height of the compartment, a stack effect is produced which causes an upward movement of air within each compartment and around the bags therein. This upward movement of the air may be controlled as desired by opening the doors 88 more or less.

In this way the desired temperature within the bag compartments and around the bags may be readily obtained; the maintenance of the proper temperature is of importance as the bag material deteriorates much less rapidly when proper temperature conditions within the bag compartments are maintained.

It will be noted that the arrangement of the flues and ducts is such that a single blower may serve all of the several compartments of a filter house and that blower both forces gases into the bags and sucks gases from the bags. When any set of bags is being shaken, the blower is so connected to those bags as to draw gases therefrom and at the same time it is forcing gases passing through flue 3, as well as those drawn from the bags under suction, through the extension 5 of the flue 3 to the bags wherein the filtering operation is being continued. It will be noted also that the bags are readily accessible and are visible at all times for inspection. Furthermore, the filtering material is used to such good advantage that with the construction herein described a material reduction is effected in the quantity of bag material necessary for a given filtering effect as well as in the size of the filter buildings. Furthermore, this construction is such that it is unnecessary for workmen to enter the filter house except for purposes of inspection or repair, such, for instance, as when it becomes necessary to change a bag or readjust parts of the apparatus. It will be noted also that the apparatus is such that accurate shaking intervals are maintained and the duration of the shaking operations is always the same. The time of the shaking operation and the intervals between successive operations may be readily adjusted as desired, but when once established, it is maintained uniform throughout the operation of the system. The extent of the shaking operation may also be adjusted readily by changing the position of the nut threaded on the upper end of rod 62 and coöperating with the arm 46 on the rock shaft 45. This nut coacts with the bifurcated end of arm 46 which straddles the rod 62 as shown in Fig. 12, and the position of the nut determines the magnitude of the movement of the parts of the shaking mechanism. It will be appreciated that the position which the nut assumes when rod 62 is raised to the position for causing valve member 18 to close the opening in duct 15 will determine the extent of the rocking movement of shaft 45 and the extent of the downward movement of rods 25. In other words, in the operation of the shaking mechanism, the parts of that mechanism are always moved in one direction to the same point by cam 47, but their movement in the other direction is determined by the position of the nut on the end of rod 62.

In the foregoing, the construction and operation of the embodiment of the invention which is at present preferred is described at length. It must be understood, however, that the invention is not limited to any particular construction nor is it limited to the use of all of the different features of the invention in coöperation. Alternative constructions embodying one or more of the features of the invention are considered to be within the scope of the invention and it is intended to include them within the terms of the claims appended hereto.

We claim:

1. A bag shaking apparatus comprising the combination of a bag, means for supporting the same, a flue connected to the bag for conveying thereto the gas containing the particles to be filtered out, and mechanical means connected to the sides of the bag at a plurality of distributed points for shaking the bag to detach particles lodged thereon; substantially as described.

2. A bag shaking apparatus comprising the combination of a bag, means for supporting the same, a flue connected to the bag for conveying thereto the gas containing the particles to be filtered out, connections to the sides of the bag at a plurality of distributed points, and means operating through said connections for alternately collapsing and expanding the bag; substantially as described.

3. A bag shaking apparatus comprising the combination of a bag, means for supporting the same, a flue connected to the bag for carrying thereto the gas containing the particles to be filtered out, a power-shaft and mechanical means connected thereto and to the sides of the bag and operated by said shaft for shaking the bag to detach therefrom solid particles that have lodged thereon; substantially as described.

4. A bag shaking apparatus comprising the combination of a bag, supports therefor connected to the sides of the bag and means for operating the supports to shake the bag; substantially as described.

5. A bag shaking apparatus comprising the combination of a bag, supporting devices therefor connected to the sides of the bag, and means for operating the supporting devices to cause the bag to be alternately collapsed and expanded; substantially as described.

6. A bag shaking apparatus comprising the combination of a bag, devices connected to opposite sides of the bag at points intermediate the ends of the bag and means for operating said devices to shake the bag; substantially as described.

7. A bag shaking apparatus comprising the combination of a bag, devices connected to opposite sides of the bag at points intermediate its ends and means for moving said devices toward and away from each other to cause alternate collapse and expansion of the bag; substantially as described.

8. A bag shaking apparatus comprising the combination of a bag, a pair of supports for the bag connected thereto at diametrically opposite points, a pair of devices connected to opposite sides of the bag at points displaced from the points of connection of said supports, and means for moving said devices away from each other to collapse the bag and then returning them to their initial position; substantially as described.

9. A bag shaking apparatus comprising the combination of a bag, a pair of supports for the bag connected thereto at diametrically opposite points, a pair of devices connected to opposite sides of the bag at points displaced from the points of connection of said supports, and means for simultaneously operating said supports and moving said devices away from each other to collapse the bag and then returning them to their initial position; substantially as described.

10. A bag shaking apparatus comprising the combination of a bag, a pair of members by which the bag is suspended, means for alternately collapsing and expanding the bag by movement of opposite sides of the bag toward and away from each other and means for lowering said members as the bag is collapsed and raising them as it is expanded; substantially as described.

11. A bag shaking apparatus comprising the combination of a bag, a pair of members by which the bag is suspended, a pair of devices connected to opposite sides of the bag and power-operated means for simultaneously moving said devices apart and lowering said members and then moving said devices toward each other and raising said members; substantially as described.

12. A bag shaking apparatus comprising the combination of an elongated bag, a pair of rods extending lengthwise of the bag and connected to opposite sides of the bag at a plurality of distributed points, and means for moving the rods toward and away from each other to collapse and expand the bag; substantially as described.

13. A bag shaking apparatus comprising the combination of an elongated bag, a pair of rods extending lengthwise of the bag and connected to opposite sides of the bag at a plurality of distributed points, links connected to the ends of the rods and means operating through said links by a toggle action to move said rods toward and away from each other; substantially as described.

14. A bag shaking apparatus comprising the combination of an elongated bag, a pair of members by which the bag is suspended, a pair of rods extending lengthwise of the bag and connected to opposite sides thereof at points displaced from the points of connection of said members to the bag, and means for reciprocating said rods toward and away from each other and simultaneously raising and lowering said members; substantially as described.

15. A bag shaking apparatus comprising the combination of an elongated bag, a pair of members by which the bag is suspended, a pair of rods extending lengthwise of the bag and connected to opposite sides thereof at points displaced from the points of connection of said members to the bag, a horizontal shaft to which said members are connected, connections from the shaft to the upper ends of the rods, links connecting the lower ends of the rods to a stationary support, and means for raising and lowering said shaft; substantially as described.

16. A bag shaking apparatus comprising the combination of a bag, a support therefor, a flue connected to the bag for conveying thereto the gas containing the particles to be filtered out, a valve in the connection from the flue to the bag and an operating mechanism for closing said valve and then alternately collapsing and expanding the bag by moving opposite sides of the bag toward and away from each other substantially as described.

17. A bag shaking apparatus comprising the combination of a bag, a flue, a blower connected in the flue for causing a flow of the gas containing the particles to be filtered out through the flue, connections from the flue on opposite sides of the blower to the bag and a valve movable to close either of said connections and open the other; substantially as described.

18. A bag shaking apparatus comprising the combination of a bag, a flue, a blower connected in the flue for causing a flow of the gas containing the particles to be filtered out through the flue, connections from the flue on opposite sides of the blower to the bag, a valve movable to close either of said connections and open the other, and means for shaking the bag to dislodge particles therefrom; substantially as described.

19. A bag shaking apparatus comprising the combination of a bag, a flue, a blower connected in the flue for causing a flow of the gas containing the particles to be filtered out through the flue, connections from the flue on opposite sides of the blower to the bag, a valve movable to close either of said connections and open the other, and a single means for operating said valve and for shaking the bag; substantially as described.

20. A bag shaking apparatus comprising the combination of a bag, a flue, a blower connected in the flue for causing a flow of the gas containing the particles to be filtered out through the flue, connections from the flue on opposite sides of the blower to the bag, a valve movable to close either of said connections and open the other, and means for operating said valve to close the connection from the flue through the blower to the bag, for opening the other connection from the flue to the bag and for alternately collapsing and expanding the bag; substantially as described.

21. A bag shaking apparatus comprising the combination of a vertically-disposed elongated bag closed at its upper end, a flue connected to the lower end of the bag, a blower for forcing gas through the flue to the bag, a valve for closing the connection to the bag through which the gas is forced by the blower and opening another connection, and means for alternately collapsing and expanding the bag; substantially as described.

22. A bag shaking apparatus comprising the combination of a vertically-disposed elongated bag closed at its upper end, a receptacle into which the lower open end of the bag extends, a flue connected to the receptacle for conveying to the receptacle and bag the gas containing the particles to be filtered out, a blower, a valve mechanism for connecting the blower, flue and bag so that the blower will force the gas to be filtered into the bag or connecting them so that the blower will draw gas out of the bag, and means for shaking the bag; substantially as described.

23. A bag shaking apparatus comprising the combination of a vertically-disposed, elongated bag closed at its upper end, a receptacle into which the lower open end of the bag extends, a flue, a blower connected therein, connections from the receptacle to the flue on opposite sides of the blower, valve mechanism for closing one of said connections and opening the other, and means for alternately collapsing and expanding the bag; substantially as described.

24. A bag shaking apparatus comprising the combination of a plurality of compartments, a plurality of bags in each compartment, a flue, a pair of connections from the flue to the bags of each compartment, a blower included in one connection of each of said pairs, a shaking mechanism for the bags in each compartment, a valve mechanism for each compartment, means for successively operating the several valve mechanisms to close one and open the other of the pair of connections of the corresponding compartment, and means for operating the shaking mechanisms of the several compartments successively after the valve mechanisms have been operated; substantially as described.

25. A bag shaking apparatus comprising the combination of a plurality of compartments, a receptacle at the bottom of each compartment, a plurality of bags in each compartment each having its lower end connected to the receptacle in the compartment, a flue, a pair of connections from the flue to each receptacle, a blower connected in one of the connections of each of said pairs, a shaking mechanism for the bags of each compartment and operating mechanism whereby in each of the several compartments successively one of the pair of connections from the flue to the receptacle is opened and the other closed and then the bag shaking mechanism is operated; substantially as described.

26. A bag shaking apparatus comprising the combination of an elongated bag closed at its end, means for suspending the bag in a vertical position, and means for shaking the bag operating through the means by which the bag is suspended to move opposite sides of the bag toward and away from each other substantially as described.

27. A filtering apparatus comprising the combination of a bag, a flue connected to the bag, a blower connected in the flue for effecting the flow of the material to be filtered through the flue to the bag, a connection from the bag to the flue on the inlet side of the blower through which gas may be drawn from the bag by the blower, and valve mechanism controlling said connection; substantially as described.

28. A filtering apparatus comprising the combination of a plurality of compartments, a plurality of bags in each compartment, a flue carrying the gases to be filtered, a connection from the flue to the bags of each compartment, a blower connected in the flue for forcing the gases to be filtered into the bags, a cleaning connection from the bags of each compartment to the flue on the inlet side of the blower, and valve mechanisms in the connections to the bags of each compartment whereby the gas to be filtered may be forced into the bags of any compartment by the blower and whereby the blower may draw gas out of the bags of any compartment; substantially as described.

29. A filtering apparatus comprising the combination of a plurality of bags, a flue for conveying the gas to be filtered to all of the bags, a blower in the flue, a connection from each bag to the flue on the inlet side of the blower, valve mechanisms in the several connections, and a power-actuated controlling device operating automatically to open the valve mechanisms of the several bags successively so as to connect the bags successively to the flue on the inlet side of the blower whereby the blower draws gas from the bags so connected into the flue; substantially as described.

30. A filtering apparatus comprising the combination of a plurality of compartments, a plurality of bags in each compartment, a flue for conveying the gas to be filtered to all of the bags of the several compartments, a blower in the flue, a connection from the bags of each compartment to the flue on the inlet side of the blower, valve mechanisms in the several connections, mechanisms for shaking the bags of the several compartments, and power-actuated controlling mechanism operated automatically to connect the bags of the several compartments successively to the flue on the inlet side of the blower and to render the several bag shaking mechanisms operative successively so that while the bags of a compartment are connected to the inlet side of the blower, the shaking mechanism for those bags will be operated; substantially as described.

31. A filtering apparatus comprising the combination of a bag, a flue connected to the bag, a blower connected in the flue for effecting the flow of the material to be filtered through the flue to the bag, a connection from the bag to the flue on the inlet side of the blower through which gas may be drawn from the bag by the blower, a valve mechanism controlling said connection, and automatic means for periodically reversing the direction of flow through the bag for a predetermined time interval by manipulation of said valve mechanism and shaking the bag during that interval; substantially as described.

32. A filtering apparatus comprising the combination of a bag, a flue for conveying the gases to be filtered, a single blower, connections from the single blower to the bag permitting the blower to cause a flow of the gas to be filtered through the flue and bag and also to cause the flow of air into and through the bag in the reverse direction, and a single means for simultaneously reversing the direction of flow in the bag and shaking the bag; substantially as described.

33. A filtering apparatus comprising the combination of a plurality of bags, a flue through which the gases to be filtered are supplied to the bags, a blower connected in the flue, connections from each bag to the flue on opposite sides of the blower, and valves controlling the connections to each bag; substantially as described.

34. A filtering apparatus comprising the combination of a plurality of bags, a flue, a blower connected in the flue, connections from each bag to the flue on each side of the blower, and a single valve for each bag adapted to close either of the connections from the bag to the flue and open the other connection; substantially as described.

35. A filtering apparatus comprising the combination of a plurality of bags, a flue for conveying the gases to be filtered, a single blower, connections from the single blower to the bag permitting the blower to cause a flow of the gas to be filtered through the flue to the several bags and also to cause the flow of air into and through the bag in the reverse direction, and automatic means for reversing the direction of flow of gas through the several bags successively; substantially as described.

36. A filtering apparatus comprising the combination of a plurality of bags, a flue connected to the bags, a blower and connections from the blower to the flue and the bags whereby the blower may cause the flow of the gases to be filtered from the flue through the bags in one direction and cause the flow of air into and through the bags in the reverse direction, and power operated controlling means actuated automatically to effect a reversal of the flow through the several bags successively; substantially as described.

37. A bag shaking apparatus comprising the combination of a bag, a flue, a blower connected to the bag and flue, means for causing the blower to force gases from the flue into the bag, a bag-shaking mechanism, means for changing the connections between the bag and the blower whereby the latter draws gases from the bag and for simultaneously operating the bag-shaking mechanism, and means for adjusting the magnitude of the bag-shaking operation; substantially as described.

38. A bag shaking apparatus comprising the combination of a bag, a flue, a blower connected to the bag and flue, means for causing the blower to force gases from the flue into the bag, a bag shaking mechanism and means for changing the connections between the bag and the blower whereby the latter draws gases from the bag and for simultaneously operating the bag shaking mechanism; substantially as described.

39. A bag shaking apparatus comprising the combination of a plurality of compartments, a plurality of bags in each compartment, a flue for the gases to be filtered, a blower connected to the flue and to all of the compartments for forcing the gases to be filtered into the bags in the compartments, a plurality of bag shaking mechanisms each operable to shake the bags in a compartment, means for changing the connections between the blower and the several compartments so that the blower draws gases from the bags in the several compartments successively, and means actuated when effecting said change of the connections for operating the bag shaking mechanism of a compartment when gases are being drawn from the bags of that compartment by the blower; substantially as described.

40. A bag shaking apparatus comprising the combination of a plurality of compartments, a plurality of bags in each compartment, a flue for the gases to be filtered, a blower which may be connected to all or any number of the compartments so that gases will be forced by the blower from the flue into the bags of those compartments, connections through which the blower may withdraw gases from the bags of the compartments, a bag shaking mechanism for each compartment and automatic operating mechanism for discontinuing the operation of the blower to force gases to be filtered into the bags of the several compartments successively, connecting the compartments successively to the blower so that the latter may draw gases from the bags of that compartment and causing operation of the bag shaking mechanism of each compartment while the bags of that compartment are having gases drawn therefrom by the blower; substantially as described.

41. A filtering apparatus comprising the combination of a plurality of filtering compartments, a plurality of bags in each compartment, a shaking mechanism for the bags of each compartment connected to opposite sides of the bags for moving said sides toward and away from each other, a power shaft extending along all of the compartments, and a power-actuated controlling mechanism which operates automatically to connect the shaking mechanisms of the several compartments successively to the power shaft to be operated thereby; substantially as described.

42. A filtering apparatus comprising the combination of a plurality of filtering compartments, a plurality of bags in each compartment, a flue extending along one side of the series of compartments, an extension of the flue extending along the opposite side of the series of compartments, a blower connected in said flue between the latter and said extension, ducts extending from the flue and from the extension to each compartment, and means for closing either of the ducts of any compartment and opening the other duct of that compartment; substantially as described.

43. A filtering apparatus comprising the combination of a compartment, a plurality of bags therein, a receptacle at the bottom of the compartment to which the bags of the compartment are connected, a pair of ducts entering the receptacle from opposite sides thereof, a flue for supplying the gases to be filtered to the receptacle connected to said ducts, a blower connected in the flue between the points of connection of the ducts thereto, and valve mechanism for closing either of said ducts and opening the other; substantially as described.

44. A filtering apparatus comprising the combination of a plurality of bags, a flue connected to the several bags, a blower connected in the flue for effecting the flow of the material to be filtered through the flue to the several bags, a connection from each bag to the flue on the inlet side of the blower through which gas may be drawn from the bag by the blower, valve mechanisms in said several connections, and automatic means for reversing the direction of flow of gas through the several bags successively by manipulation of said valve mechanisms; substantially as described.

45. A filtering apparatus comprising the combination of a plurality of compartments, a plurality of bags in each compartment, a flue connected to all of the bags of all of the compartments, a blower for causing a flow of the gas to be filtered through the flue and into the several bags, and automatic means for causing the said blower to reverse the direction of flow through the bags of the several compartments successively for a predetermined time interval and shaking the bags of each compartment during that interval; substantially as described.

46. A filtering apparatus comprising the combination of a bag, a flue through which the gases to be filtered are supplied to the bag, a blower for effecting the flow of said gases through the flue to the bag, means for causing the said blower to draw air into the bag from the exterior thereof through the material of the bag, shaking mechanism for the bag, and means for simultaneously discontinuing the supply of the gases to be filtered to the bag, reversing the direction of flow in the bag by drawing air into the bag through the material thereof and operating the shaking mechanism of the bag; substantially as described.

47. A filtering apparatus comprising the combination of a bag, a flue through which the gases to be filtered are supplied to the bag, means for drawing air into the bag through the material thereof from the exterior, shaking mechanism for the bag, and automatic means for simultaneously discontinuing the supply of the gases to be filtered to the bag, reversing the direction of flow in the bag by drawing air into the bag through the material thereof and operating the shaking mechanism of the bag, and for thereafter simultaneously restoring the original direction of flow by supplying gases to be filtered to the bag and discontinuing the operation of the shaking mechanism; substantially as described.

48. A filtering apparatus comprising the combination of a plurality of bags, a flue through which the gases to be filtered are supplied to the bags, means for drawing air into the bags through the material thereof from the exterior, shaking mechanisms for the several bags, and means operating with respect to the several bags in succession for simultaneously discontinuing the supply of the gases to be filtered to the bag, reversing the direction of flow in the bag by drawing air into it through the material of the bag and operating the shaking mechanism of the bag; substantially as described.

49. A filtering apparatus comprising the combination of a plurality of compartments, a plurality of bags in each compartment, a flue through which the gases to be filtered are supplied to the bags of all the compartments, a blower for effecting the flow of said gases through the flue to the bags of the several compartments, means for causing the said blower to draw air into the bags through the material thereof from the exterior, a shaking mechanism for the bags of each compartment, and automatic means operating with respect to the bags of the several compartments in succession for simultaneously discontinuing the supply of the gases to be filtered to the bags of the compartment, reversing the direction of flow in the bags by drawing air into them through the material thereof and operating the shaking mechanism of the bags and for thereafter simultaneously restoring the original direction of flow by supplying the gases to be filtered to the bags of the compartment and discontinuing the operation of the shaking mechanism of those bags; substantially as described.

50. A filtering apparatus comprising the combination of a bag, a shaking mechanism therefor, a flue carrying the gases to be filtered to the bag, a blower in the flue, a connection from the bag to the inlet side of the blower, a valve in said connection, and automatic operating means for opening the valve in said connection so that the blower can draw gas from the bag and for simultaneously operating the shaking mechanism; substantially as described.

51. A filtering apparatus comprising the combination of a plurality of bags, a shaking mechanism for each bag, a flue connected to the bags for conveying the gases to be filtered thereto, a blower for propelling the gases through the flue, a connection from each bag to the inlet side of the blower, a valve in each connection, and automatic operating means for opening all of said valves in succession so that the blower can draw gas from the bag whose valve has been opened and for causing simultaneous operation of the shaking mechanism of the bag whose valve has been opened; substantially as described.

In testimony whereof we affix our signatures.

GEORGE SAGE BROOKS.
L. GRANT DUNCAN.

It is hereby certified that in Letters Patent No. 1,240,305, granted September 18, 1917, upon the application of George Sage Brooks and Lawrence Grant Duncan, of Depue, Illinois, for an improvement in "Filtering Apparatus," errors appear in the printed specification requiring correction as follows: Page 3, line 118, after the word "blower" insert a comma; page 7, line 41, for the word "angular" read *regular;* and that the said Letters Patent should be read with these corrections therein that the same may conform to the record of the case in the Patent Office.

Signed and sealed this 20th day of November, A. D., 1917.

[SEAL.]
R. F. WHITEHEAD,
*Acting Commissioner of Patents.*

Cl. 183—57.